United States Patent [19]
Bishop

[11] Patent Number: 5,426,434
[45] Date of Patent: Jun. 20, 1995

[54] SEMIAUTOMATIC JAM-ACCEPT (SAJAC) DECIDER FOR MODE-4 OF THE IFF MARK XII

[76] Inventor: Walton B. Bishop, 6 Balmoral Dr., Oxon Hill, Md. 20021

[21] Appl. No.: 78,317

[22] Filed: Sep. 3, 1970

[51] Int. Cl.⁶ .................... G01S 13/78; G01S 13/80
[52] U.S. Cl. ........................................ 342/45; 342/13
[58] Field of Search ............ 343/6.5 R, 6.5 LC; 342/45, 42, 30, 39, 40, 46, 13, 16, 17

[56] References Cited
U.S. PATENT DOCUMENTS

| | | | |
|---|---|---|---|
| 3,058,104 | 10/1962 | Garfinkel et al. | 343/6.5 LC |
| 3,182,310 | 5/1965 | Humpherys | 343/6.5 LC |
| 3,357,016 | 12/1967 | Peronneau et al. | 343/17.7 |
| 3,368,219 | 2/1968 | Gardner | 343/6.5 LC |
| 3,440,651 | 4/1969 | Fluhr et al. | 343/6.5 LC |
| 3,573,823 | 4/1971 | French | 342/43 |
| 3,750,163 | 7/1973 | Hecker | 342/45 |
| 3,983,482 | 9/1976 | Doherty | 342/45 X |
| 4,074,263 | 2/1978 | Sullivan, Jr. | 342/45 |
| 4,278,976 | 7/1981 | Alpers et al. | 342/42 |
| 5,101,208 | 3/1992 | Parker | 342/45 |

Primary Examiner—John B. Sotomayor

[57] ABSTRACT

A semiautomatic jam-accept decider for use in an interrogator responsor installation in which an operator selects a particular range and azimuth of interest. The decider can make Accept decisions concerning IFF Mark XII Mode 4 reply targets in the presence of extraneous signals. Enemy spoofing or jamming of the Mode by transmitting on the reply frequency can also be detected and the position of the enemy aircraft can be determined.

5 Claims, 7 Drawing Sheets

SEMIAUTOMATIC JAM-ACCEPT (SAJAC) DECIDER FOR MODE-4 OF THE IFF MARK XII

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to aircraft identification systems having the ability to reduce the probability of an enemy deceiving the user to appear as a friend, as well as identifying the enemy as such.

Along with the development of radar and its ability to detect targets came the problem of target identification.

In military air operations in which a radar seeks out targets in the air, the interrogator is aided in determining whether echo indications on its radar indicator screen are those of friendly or unfriendly aircraft by an interrogator-responsor system, commonly known as IFF, which stands for Identification, Friend or Foe. An interrogation transmitter system, when utilized with a transponder, transmits a coded signal consisting of a train of timewise spaced pulses. The coded signal generated by the interrogation system is received by the transponder and analyzed. If the pulses are of the correct frequency, amplitude and spacing, an output signal will be produced by the transponder. The interrogation system, may for example, be positioned on the ground while the transponder may be mounted in an aircraft and be utilized for identification purposes or for deriving other information such as altitude or bearing of the aircraft. The reply indicates the identity and location of the aircraft.

IFF systems are used in the identification of friendly aircraft and an important consideration in the design of the system is the prevention of an enemy from making use of our IFF system for his own purpose. Several identification systems have been widely used. Most noteworthy of these systems are the Mark X system, with the Selective Identification Feature (SIF), and, more recently, the Mark XII military crypto-secure IFF Mode 4, which identifies all friendly targets that have the correct cryptographic key setting. Its identification is made by using short bursts of two way signals as the interrogation antenna sweeps past a target.

Reply evaluation processes for the classified Mode 4 of the IFF Mark XII have been studied for a long time. These studies have tried to determine only when a Mode 4 replying target should be accepted as a friend. The ability of automatic equipment to determine when a Mode 4 replying target should be accepted as a friend and when it should be labeled as the result of an enemy's jamming or trying to guess correct replies was summarized in Appendix 5 of a Secret USAF Ad Hoc Committee Report (1966). It has been known for some time that if an enemy tries to spoof Mode 4, i.e., appear as a friend, by transmitting on the reply frequency, or if he attempts to jam our reply transmission, he will provide sufficient radiations unlike those emanating from friends to permit his identification positively and immediately as an enemy.

SUMMARY OF THE INVENTION

The semiautomatic Jam-Accept Decider is for use in an IFF Mark XII Mode 4 interrogator-responsor installation in which the operator selects a particular range and azimuth of interest. The Decider, using logic circuitry, analyzes Mode 4 replies present in the selected range-azimuth gate and decides automatically whether the replies came from a friend who should be "accepted" as such, if and only if, the target responds correctly seven times in succession (a run of seven successes) to a sample of 20 Mode 4 interrogations. This sample is selected automatically as soon as four Mode 4 responses are received in succession. (The sample of 20 interrogations may include the four that caused the sample to be selected.) The circuits described in this specification provide for the possible acceptance of as many as five in-line targets separated by 4.0 $\mu$sec of radar range.

Each time a sample of 20 Mode 4 interrogations is selected for use in making Accept decisions, a sample of 16 Mode 4 interrogations is selected for use in determining if jamming signals are present. (The 16 interrogations chosen for Jam analysis are the last 16 of those chosen for Accept analysis.)

Each time a sample is selected the Jam Decider examines 15 of the 31 positions where Mode 4 replies could occur if an enemy were trying to spoof by guessing Mode 4 replies, or if he were simply trying to jam the reply frequency. Threshold settings are provided to permit a Jam decision to be made when an enemy provides (a) two or more replies per Mode 4 interrogation, (b) three or more replies per Mode 4 interrogation, or (c) four or more replies per Mode 4 interrogation, and otherwise to continue accepting friendly targets correctly. The threshold settings are made sufficiently adjustable to allow for various expected levels of traffic density and to satisfy any of the currently established Friend-Rejection and Enemy-Acceptance criteria.

The decision may be displayed alongside the normal radar/IFF target or they may be displayed separately, and the jammer's exact azimuth can be determined.

OBJECTS OF THE INVENTION

It is therefore an object of the present invention to provide for an improved Identification, Friend or Foe system.

A further object of the present invention is to provide for an improved system for aircraft identification of the aircraft is manifested on the radar indicator itself.

Another object of the present invention is to provide for an electronic IFF device to made Accept decisions concerning IFF reply signals more accurately and more efficiently than previously attainable.

Yet another object of the present invention is to provide for a semiautomatic decider in an IFF interrogator.

A still further object of the present invention is to provide for a reduction in the rate in which IFF interrogations are transmitted.

A still further object of the present invention is to provide for an IFF interrogator capable of indicating the presence of an enemy spoofing or jamming its reply frequency.

Yet another object of the present invention is to provide for an IFF system capable of making Accept decisions regarding replying targets in the presence of extraneous signals.

A still further object of the present invention is to provide for an IFF decision maker for use with the Mark XII Mode 4 IFF system for indicating either the presence of a friend or an enemy transmitting on the reply frequency and display them as such.

These and other objects, advantages and novel features of the present invention will become apparent from the following detailed description of the invention when considered in conjunction with the accompanying drawings wherein:

DESCRIPTION OF THE PREFERRED EMBODIMENT

Figure 1:
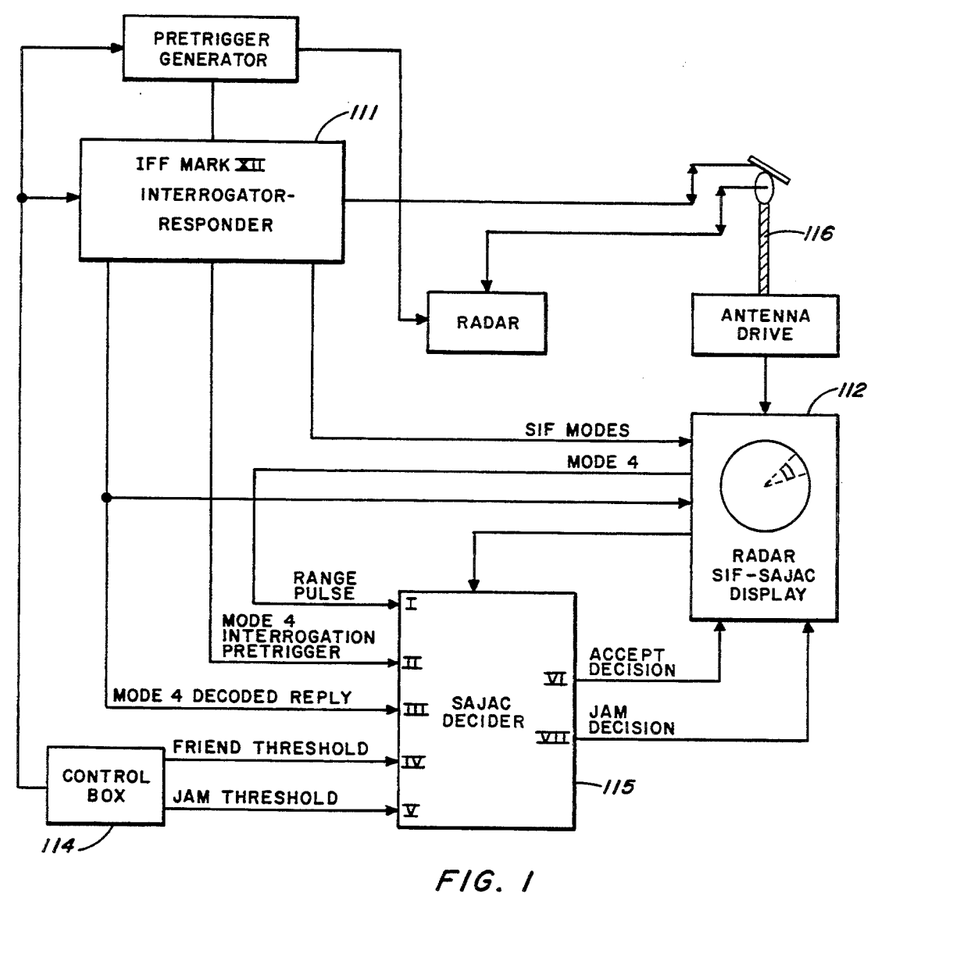
FIG. 1 is a block diagram of the IFF Mark XII with the Semiautomatic Jam-Accept Decider.

FIG. 1 shows where the Semiautomatic Jam-Acceptor (SAJAC) Decider 115 fits into the IFF Mark XII system. Ideally, it should be an integral part of the IFF Mark XII 111, but it can easily be connected externally, as shown. The "Friend Threshold" and the "Jam Threshold" settings may be made by means of switches on a control box 114, or they may be made in the JAC Decider 115 itself. Only initial installation adjustments to allow for various Friend-Rejection and Enemy-Acceptance ratios should be required. The circuits described for the SAJAC Decider 115 should be capable of operating with any interrogation rate that the radar/IFF operator may desire. However, if maximum efficiency of operation is desired, Mode 4 interrogation rates should be adjusted so that only about 20 Mode 4 replies are received from each target during an antenna 116 scan past that target. The SAJAC Decider 115 will ignore replies to any SIF interrogations (Modes 1, 2, 3/A, B, C, or D) that may be interlaced with Mode 4 interrogations. Displays 112 may show Accept decisions, Jam decisions, or both, either alongside normal radar and IFF displays or on a separate display unit. Both the Accept and the Jam decisions will be displaced in azimuth usually in the direction of antenna scan. Circuits that will locate the mean azimuth (beam center) of Mode 4 and/or SIF responses could easily be provided, but many ground surface display units would not be capable of using such information. Range discrimination between friendly targets will be approximately 0.3 naut mi (4.0 $\mu$sec of radar range), and the range where jamming occurs will be indicated with the same precision. However, since a jammer need not actually be where he appears to be, it seems advisable to use an azimuth-only display for jamming decisions.

Figure 2:
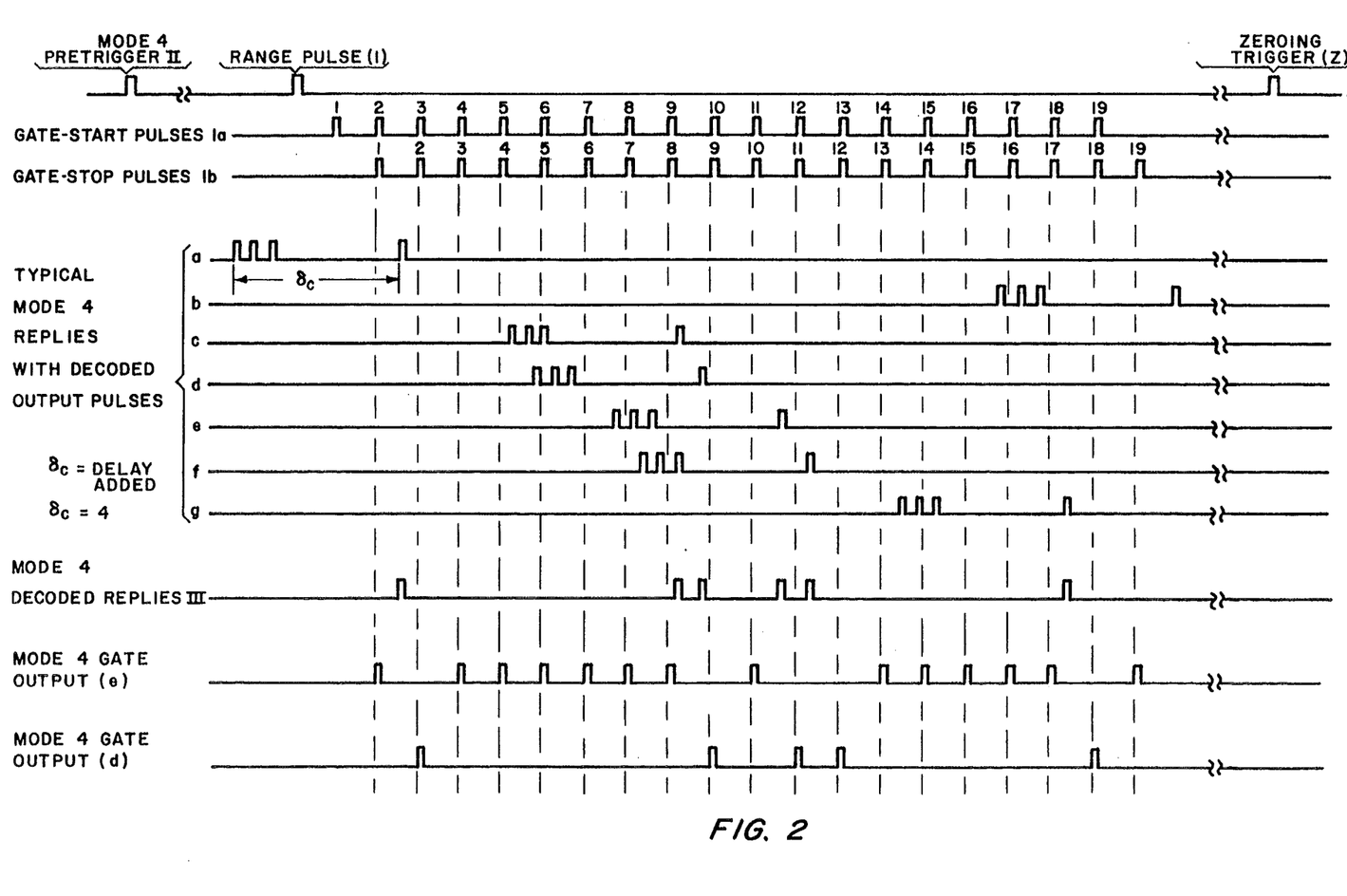
FIG. 2 is a timewise plot of the Jam-Accept Decider waveforms.

The time relationship between some important inputs and intermediate outputs of the SAJAC Decider are shown in FIG. 2. Each time a Mode 4 pretrigger II is followed by a range pulse I, two sequences of pulses are generated. These pulses are used to start and stop gate circuits which select signals to be used in making Jam or Accept decisions. The spacing between pulses in each sequence is 4.0±0.1 $\mu$sec, the nominal spacing between possible Mode 4 reply positions. Since the radar/IFF operator selects the range and azimuth of interest, he controls the time at which input I occurs and thus the positions of the two sequences of gate pulses.

Mode 4 replies are normally decoded into single pulses in the Interrogator-Responsor 111 and are then delayed a fixed multiple of 4.0 $\mu$sec, depending upon the interrogation (and, of course, the key setting) used. Seven typical Mode 4 replies are shown in FIG. 2 along with the resulting output pulses after a delay of 16 $\mu$sec has been added to each.

If one or more decoded Mode 4 reply pulses III arrives at the Mode 4 Gate between the arrival of a particular gate-start pulse (sequence 1a in FIG. 2) and its corresponding gate-stop pulse (sequence 1b in FIG. 2), a pulse coincident with the gate-stop pulse will appear at Mode 4 Gate output (d). If no decoded Mode 4 reply has reached the Mode 4 Gate during this interval, a pulse coincident with the Gate-stop pulse will appear at Mode 4 Gate output (e). Outputs (d) and (e) of the Mode 4 Gate are used to determine if decoded Mode 4 replies III appear in the same 4-$\mu$sec gate seven times in succession during a sample of 20 Mode 4 interrogation reply pairs.

Figure 3:
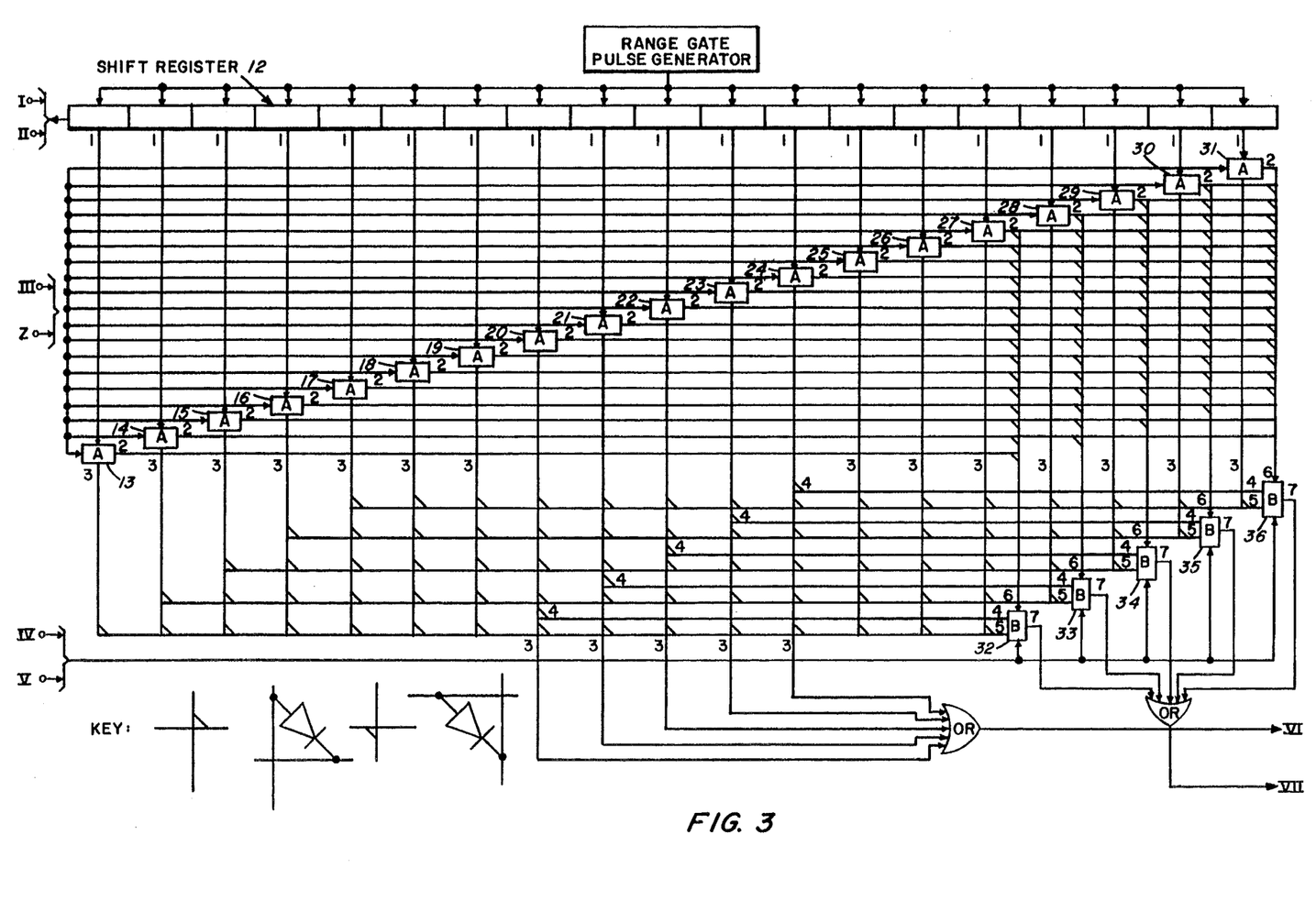
FIG. 3 is a block diagram of the Jam-Accept Decider.

FIG. 3 shows the interconnections of the overall operation of the SAJAC Decider. Mode 4 targets whose decoded Mode 4 replies fall in range gates 20, 21, 22, 23, or 24, as determined by gate-start and gate-stop pulses coming from the shift register 12, will be accepted as friends if they reply correctly seven times in succession during a sample of 20 rounds selected from those that occur during a single antenna scan past the target. If the total number of Mode 4 replies occurring in the 15 range gates surrounding any Accept Decider "A" circuits 13-31 is greater than a particular preset "Jam-Threshold" number, a "Jam Decision" will be made.

The 19-stage shift register 12 of FIG. 3 provides the gate-start and gate-stop pulses 1 required for a JAC Decider that covers 20 $\mu$sec of range time (slightly over 1.5 naut mi). "A" circuits 20 through 24 accept inputs of the type shown in FIG. 2 (gate-start, gate-stop, and Mode 4 decoded-reply pulses, plus a zeroing pulse) and provide outputs (a) Output 2: a measure of the total Mode 4 reply count, (b) Output 3: Accept decision, and (c) Output 4: Jam-Analysis gate.

"A" circuits 13 through 19 and 25 through 31 have similar inputs but provide only outputs 2 and 3. Outputs 3 of "A" circuits 20 through 24, the Accept decision, go directly to JAC Decider output VI for display as well as to "B" circuits 32 through 36. The other outputs go only to circuits 32 through 36 which determine if the Accept decisions could have resulted from enemy action. Outputs 3 of "A" circuits 13 through 19 and 25 through 31 go only to "B" circuits. Outputs 2 from all A circuits go only to B circuits.

Let us suppose that "A" circuit 21, for example, receives four decoded Mode 4 replies resulting from four successive Mode 4 interrogations. Coincident with the gate-stop pulse 1b that signifies the presence of the fourth decoded Mode 4 reply, a gate signal will appear on output 4 of 21, causing "B" circuit 33 to start counting both the number of those range gates connected to "A" circuits 14 through 28 that contain decoded Mode 4 replies and the number of Accept decisions made by these circuits following each interrogation. As soon as 16 more Mode 4 rounds have been completed, the gate signal on output 4 of A will end, causing B circuit 33 to compare the total number of range gates containing Mode 4 replies with the number that should have contained such replies if only friends had been transmitting them. If the total number of range gates containing decoded Mode 4 replies is greater than a predetermined number, a number considerably larger than could normally be expected from friends, "B" circuit 33 will generate a pulse on its output 7 signifying that jamming is present, a Jam decision. This Jam-decision signal is made available to the display system through JAC Decider output VII. Normally, an Accept decision will be reached by "A" circuit 21 before the Jam-analysis gate on lead 4 ends. (The Accept decision is made if and only if a run of seven successive decoded Mode 4 reply pulses reach circuit A in the sample of 20 rounds examined.) However, it is possible for a Jam decision to be made by "B" circuit 33 even through circuit 21 does not make an Accept decision.

If a range gate wider than the 20 $\mu$sec provided by "A" circuits 21 through 24 is desired, more circuits of the same type may be inserted into the Decider, and with each such A circuit there must be a corresponding B circuit. The first seven and the last seven A circuits remain the same as shown in FIG. 3, and the overall inputs and outputs remain unchanged regardless of the total number of circuits used.

Accept decisions will be displayed at the proper range if they are connected directly to a PPI scope. They will not be at the mean azimuth of signals received, however, since this simple JAC Decider offers no "beam centering." Jam decisions also will indicate exactly which range is being jammed and will usually be displaced slightly in the direction of antenna scan. However, the presence of jamming signals at a particular range gives no assurance that the jammer is actually at this range. An intelligent jammer could phase his transmissions so that his signals would appear to come from a range other than that of his actual position. Consequently, an azimuth-only display of Jam decisions is recommended.

The Shift Register

Figure 4:
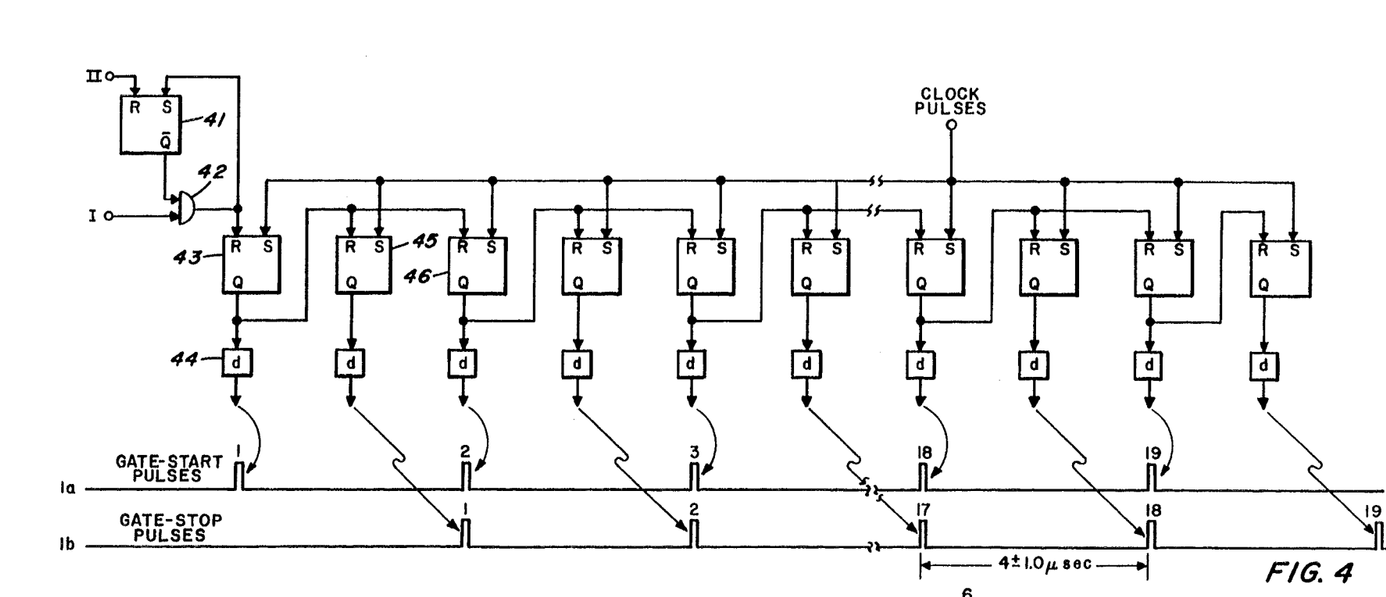
FIG. 4 is a block diagram of the shift register of the Jam-Accept Decider.

FIG. 4 provides a details concerning how the Shift Register of FIG. 3 may be designed. This "double" shift register is conceptually very simple and requires only the addition of appropriate differentiating circuits [d] to provide the two sequences of pulses required to start and stop gates at appropriate times. Obviously, there are several other ways that the same results can be accomplished. IT must be remembered, however, that each of the 38 pulses goes to its own particular destination, an input to one of the Mode 4 Gates as shown in FIG. 5.

The shift register may receive clock pulses continuously. However, no outputs will be produced until a Mode 4 pretrigger II resets switch 41 to cause its output to become $\overline{Q}=1$, which provides one input to AND gate 42. Thus, when a range pulse 1 follows a Mode 4 pretrigger II shift-register stage 43 will be reset. The next clock pulse to arrive will then set stage 43 causing the differentiation circuit d 44 to produce a gate-start pulse output 1a and simultaneously causing shift register stages 45 and 46 to be reset. Thus, the second clock pulse will produce gate-stop pulse 1 and gate-start pulse 2 simultaneously but on separate leads. The process will continue until all shift register stages have been set. The shift register will then be ready to receive another Mode 4 pretrigger II and repeat the entire process.

The Accept Decider

Figure 5:
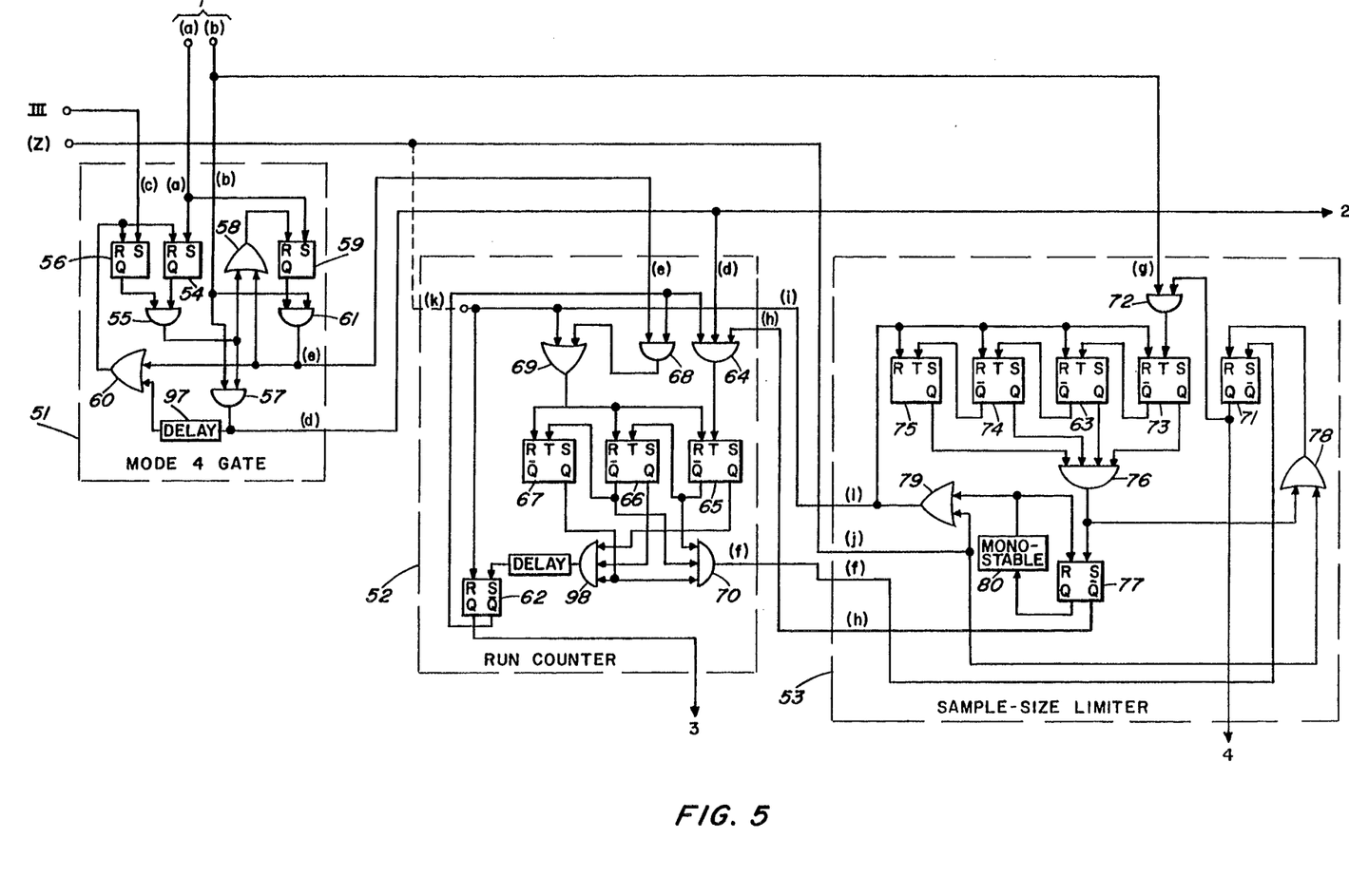
FIG. 5 is a block diagram of the Accept Decider logic.

General Description—The functions to be performed by the Accept Decider can be described most simply by referring to its block diagram, FIG. 5. Gate-start pulses enter the Mode 4 Gates through input (a), and gate-stop pulses enter through input (b). Decoded Mode 4 reply pulses (as shown in FIG. 2) enter through input (c).

If one or more decoded Mode 4 reply pulses III arrive at the Mode 4 Gate between the arrival of a gate-start pulse and a gate-stop pulse (a 4.0±0.1 $\mu$sec interval), an output will be produced on lead (d) of the Mode 4 Gate. If no decoded Mode 4 reply pulse arrives during the interval between gate-start and gate-stop pulses, an output will be produced on lead (e).

As soon as four outputs on lead (d) have occurred in succession, the Run Counter 52 will generate an output on its lead (f) causing the Sample-Size Limiter 53 to generate a gate on its output 4 and simultaneously to start counting gate-stop pulses reaching it through input (g). Immediately after the 16th succeeding gate-stop pulse has reached the Sample-Size Limiter 53, the gate on output 4 will be ended and the Run Counter 52 will be disabled via lead (h). Some 0.2 $\mu$sec later, a time long enough to permit the antenna to move to a new target, the Sample-Size Limiter 53 will be reset so that it can accept a new sample, and simultaneously, outputs on leads (h) and (i) will reset the Run-Counter 52 so that it can select a new sample.

If the Run Counter 52 finds a run of seven successive (d) inputs before it is disabled by the Sample-Size Limiter, it will immediately generate an output on lead 3, indicating that an Accept decision has been made. The Run Counter 52 then refuses to accept inputs on (e) and (d) until it is reset by the Sample-Size Limiter 53. If the run counter 52 fails to find a run of seven successive (d) inputs before it is reset by the Sample-Size Limiter 53, no Accept decision occurs. Also, if the interrogator-responsor passes beyond the azimuth selected by an operator before the Sample-Size Limiter 53 reaches the end of its chosen sample (and thus produces the resetting outputs on (h) and (i)), an input (z) will immediately reset the Sample-Size Limiter 53 and cause it to reset the Run Counter 52.

Mode 4 Gate—A gate-start pulse on input (a) sets switch 54 so that its output becomes $Q=1$, thus providing one input to AND gate 55. If this pulse is followed by a decoded Mode 4 reply pulse III on input (c) before a gate-stop pulse arrives on lead (b), the output of switch 56 will also be set to $Q=1$. Thus, a signal will pass through AND gate 55 to provide an input to AND gate 57, and at the same time it will pass through OR gate 58 to reset switch 59 so that its output becomes $Q=0$. When a gate-stop pulse then arrives on (b), a signal will pass through AND gate 57 to output (d), and after a slight delay in delay 99 it will pass through OR gate 60 to reset switches 54 and 56 so that the process may be repeated when the next gate-start pulse arrives on (a). The gate-stop pulse is prevented from passing through AND gate 61 because the other input to AND gate 61 was removed when switch 59 was reset. If no decoded Mode 4 reply pulse arrives between the arrival of a gate-start pulse on input (a) and the arrival of a gate-stop pulse on (b), then the gate-stop pulse will pass through AND gate 61, since switch 59 is set by each gate-start pulse so that its output has $Q=1$. The signal that thus passes through AND gate 61 goes directly to output (e), and, after a slight delay, passes through OR gate 60 to reset switch 59 and through OR gate 60 to reset switch 54 (switch 59 remains in the reset position, since no pulse appeared on input (c)).

In summary, the Mode 4 gate is "alerted" by a gate-start pulse on input (a). If one or more decoded Mode 4 reply pulses III appear on input (c) before a gate-stop pulse appears on input (b), then the gate-stop pulse produces an output pulse on lead (d). If no decoded Mode 4 reply pulses III appear on input (c) during the interval between the appearance of a pulse on input (a) and a pulse on input (b), then the gate-stop pulse produces an output on lead (e). All three switch flip-flops 54, 56 and 59 are reset shortly after an output pulse occurs.

Run Counter and Sample-Size Limiter—Switch 62 of the Run Counter 52 and Switch 63 of the Sample-Size Limiter 53 are normally in the reset state, with Q=1. Thus, when a pulse appears on input (d) it passes directly through AND gate 64 to T of toggle switch 65. If such pulses occur in succession (with no pulses occurring on input (e)), then the run counter consisting of 65, 66 and 67 counts up to seven. If a pulse occurs on input (e) anytime before a count of seven is reached, however, it will pass through AND gate 68 and OR gate 69 to reset the run counter 52 to zero. When run counters 65, 66 and 67 reach four, three inputs to AND gate 70 are provided so that switch 71 of the Sample-Size Limiter 53 is set. The output Q=1 of switch 63 then provides one input to AND gate 72 so that succeeding gate-stop pulses entering through input (g) will reach input T of toggle switch 73. Thus the counter 73, 63, 74, and 75 will count the next 20 such pulses. The Q=1 output of toggle switch 74 also provides a gate at output 4, which is needed to enable the Jam-signal monitoring circuit shown in FIGS. 3 and 6.

If a count of seven is reached by the run-counter register 65, 66, 67 before a count of 16 is reached by counter 73, 63, 74, 75 (the fact that the Run Counter 52 may be set back to zero after the Sample-Size Limiter 53 has started its count to 16 makes no difference to the Sample-Size Limiter's count), then switch 62 is set via AND gate 98 so that a signal appears on output 3. This output is the Accept decision to be displayed. It is also used to activate circuits in B (through leads 4 and 5) which analyze all nearby Mode 4 reply signals to determine if jamming is present or not. When switch 62 is set, its output $\overline{Q}$ is changed from 1 to 0, thus removing one of the inputs to AND gate 64 and AND gate 68 so that no more inputs through either (d) or (e) will be accepted.

When the Sample-Size Limiter 53 reaches a count of 16, a signal will pass through AND gate 76 to set switch 77 and through OR gate 78 to reset switch 71. The resetting of switch 71 ends the Jam-analysis gate on output 4 and removes an input from AND gate 72 so that no further inputs on lead (g) will be accepted. The setting of switch 77 makes its output $\overline{Q}=0$ so that AND gate 64 of the Run Counter 52 is immediately disabled via lead (h), and then, after a delay of about 0.2 sec (produced by the monostable delay circuit 80), the counter 73, 63, 74, 75 is reset via OR gate 79 and lead (i). Note that the Run Counter 65, 66, 67 is reset to zero via OR gate 69 and that switch 62 is then reset so that both AND gate 64 and AND gate 68 are provided with an input. Also, at the same time that the Run Counter 52 and the Sample-Size Limiter 53 are set to zero, the output from monostable 80 resets switch 77 so that its output $\overline{Q}=1$. This provides a second input to AND gate 64 via lead (h) so that the Run Counter 52 is prepared to receive more inputs from the Mode 4 gate on either lead (d) or lead (e). It should be noted that if the Run Counter 52 has not completed its run of seven by the time the 20 Mode 4 rounds in a sample have been completed, it will not be able to do so until after the Sample-Size Limiter 53 has completed its count and a new target has been selected. A new sample of Mode 4 decoded replies can be accepted approximately 0.2 sec (as determined by the monostable delay circuit 80) after the examination of one set has been completed.

Input (z) provides a zeroing pulse that indicates an end to the azimuth gate selected for observation. A pulse on input (z) performs a useful function only if the Sample-Size Limiter 53 has not reached a full count of 16 when it arrives. In this case the pulse from input (z) through input (j) passes through OR gate 78 to reset switch 71, thus ending the Jam-Analysis gate 4, and passes through OR gate 79 to reset the Sample-Size Limiter 53 and the Run Counter 52.

Normally, an A circuit (20 through 24) selects only one sample of 20 Mode 4 replies for analysis in making an Accept decision. The sample selected will always start with a run of four successive acceptable decoded Mode 4 replies III. However, it will automatically select another sample after 0.2 sec if the antenna remains on a replying target. The circuit also informs the associated "B" circuit when the analysis of a sample for an Accept decision starts and when it stops so that circuit B can count the adjacent gates that contain decoded Mode 4 replies which might have come from a spoofer or jammer. Circuit B is thus prepared to make a statistical decision concerning the likelihood of jamming on the basis of Mode 4 replies received from a sample of 16 Mode-4 interrogations.

Jam Data Collector—"A" circuits 13 through 19 and 25 through 31 are exactly the same as "A" circuits 20 through 24, except that they require no Sample-Size Limiter. The dashed lines in FIG. 4 shows how the zeroing input (k) should be connected to these circuits. Of course AND gate 64 must be changed from a three-input AND circuit since there will be no input (h).

It should be emphasized that none of the four numbers used in the Accept Decider described here are firm. The sample size may very well be reduced to something less than 20 (mathematical results indicate that ten should be adequate), the run of four used to start the Sample-Size Limiter may be either reduced or increased, the run of seven selected for Accept decisions varies automatically with the sample size and with EA and FR requirements to be satisfied, and the size of the sample analyzed for Jam decisions can easily be made either larger or smaller than 16. It is believed, however, that the numbers chosen are representative of those actually required for installations where semiautomatic operation is employed. The operational performance of a JAC Decider using these parameters will certainly provide some of the information needed for completing the final design.

The JAM Decider

Figure 6:
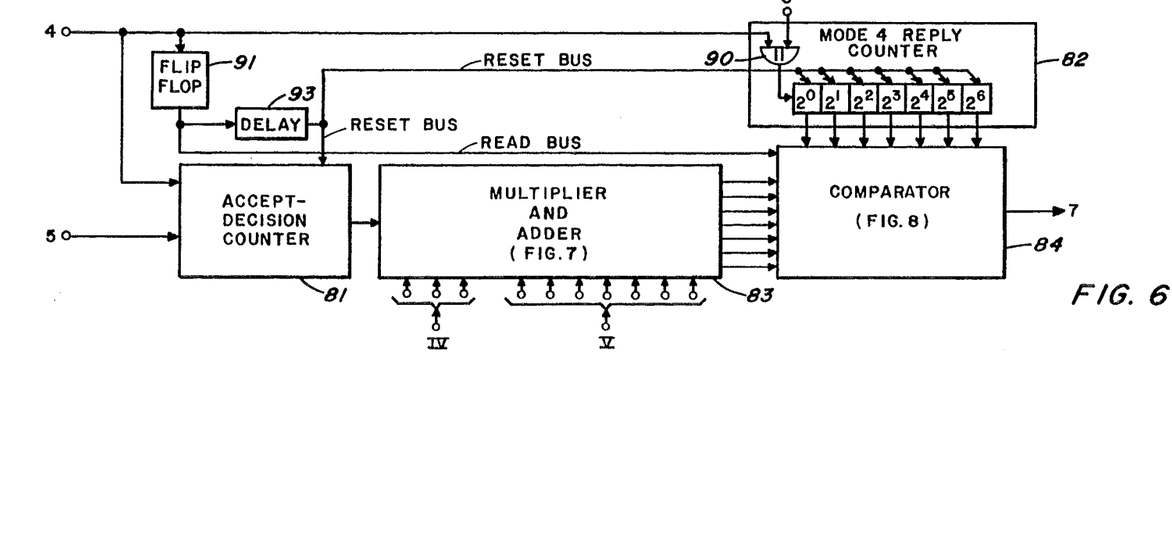
FIG. 6 is a block diagram of the Jam Decider logic.

Referring now to FIG. 6, the JAM Decider B (circuits 32 through 36 of FIG. 3) is enabled by a gate appearing on input (4). When the gate is present, Accept decisions occurring in the 15 A circuits connected to input 4 are premitted to enter B and are counted by the Accept-Decision Counter 81. Similarly, when the gate is present, all outputs on lead 2 of the same 15 A circuits are permitted to enter B via input 6 and are counted by the Mode 4 reply Counter 82.

The number of Accept decisions is continuously multiplied by the Friend Threshold $T_f$, which approximately equals the number of replies expected from a friend during each sample. This number depends on the expected round reliability of friends and the number of extraneous friendly replies (fruit). Ordinarily it should not be larger than the sample size. However, Jam decisions are based upon the relationship $$R - T_f A \leq T_j \quad (1)$$

where R is the number of Mode 4 replies, $T_f$ is the Friend Threshold, the multiplier used for each Accept decision, A is the number of Accept decisions, and $T_j$ is the Jam-Threshold number.

A Jam decision results each time relationship (1) is not satisfied. Therefore, a change in $T_f$ is equivalent to a larger change in R (of opposite sign) and may be much simpler to accomplish with the types of circuits involved; hence, R may be considerably larger than the sample size. (Input IV to the Multiplier and Adder shows three inputs to allow multiplication by 15, 20, or 25.) Input V to the multiplier and Adder is the Jam-Threshold input. Its value should be roughly two, three, or four times the number of replies ordinarily expected from a friend in a sample of 16 Mode 4 rounds. (Setting the Jam Threshold to three times the number of replies expected from a friend will permit an enemy three reply guesses per Mode 4 interrogation, etc.)

Relationship (1) may also be written $$T_f A + T_j \geq R \quad (2)$$

The Multiplier and Adder multiplies the number of Accept decisions A by the Friend Threshold $T_f$ and adds this product to the Jam Threshold $T_j$. The resulting sum is then fed into the Comparator 84 where it is compared with the actual count in the Mode 4 Reply Counter 82. If the Mode 4 Reply Counter 82 reaches a number greater than the sum $T_f A + T_j$, an output will appear on lead 7 immediately following the end of the Jam-Analysis gate on input 4. This output goes to the display unit via JAC Decider output VII.

Figure 7:
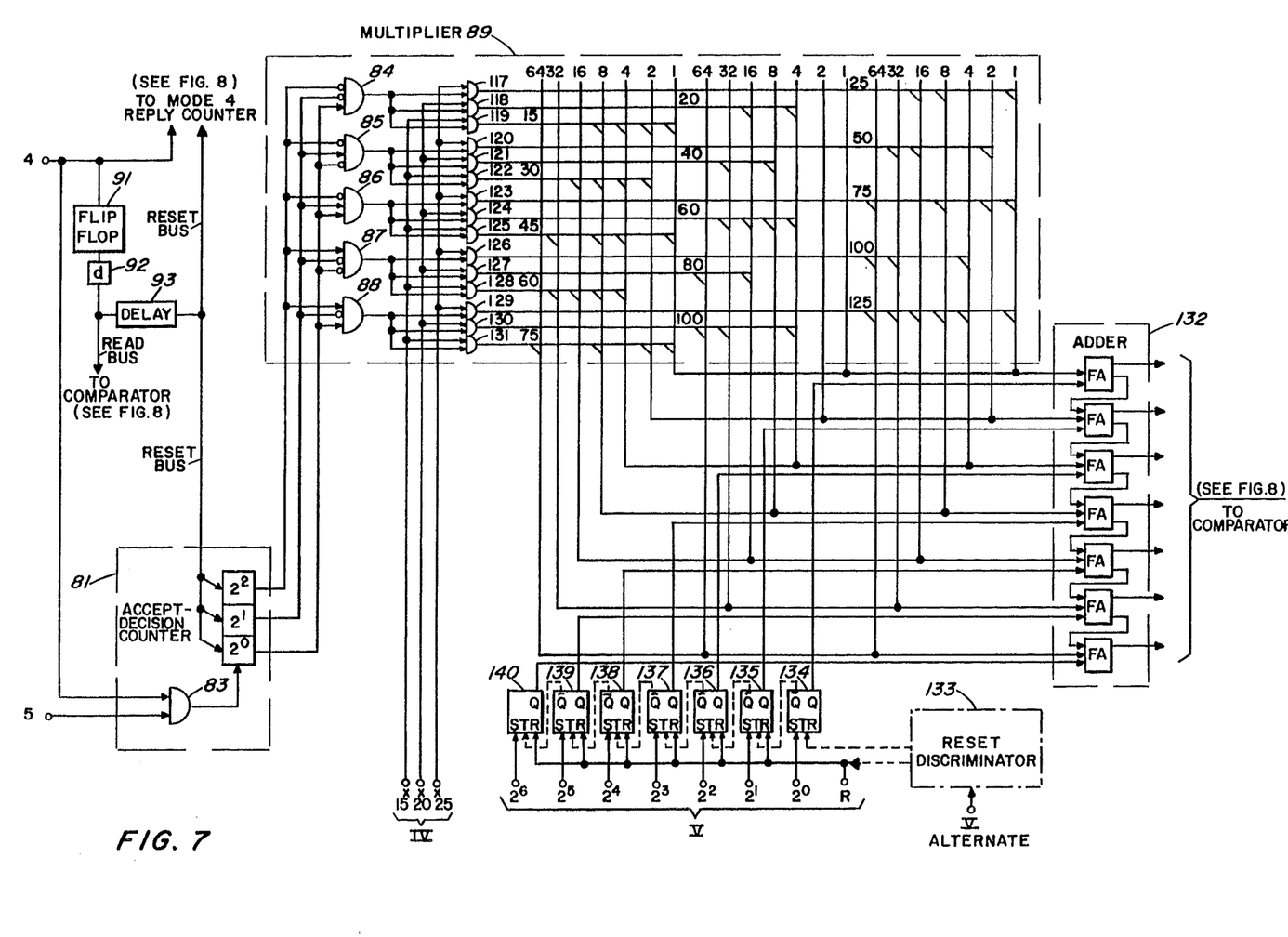
FIG. 7 is a block diagram of the Multiplier and Adder of the Jam Decider logic.

Multiplier and Adder—Referring now to FIG. 7, the Accept-Decision counter 81 is required to count only as high as the number of in-line friends expected within the Jam-Analysis range gate. This gate occupies 15×4.0 μsec of range time and is automatically centered on a target whose replies are being analyzed for a possible Accept decision. Only the first five numbers of the counter shown in FIG. 7 are connected for multiplication by $T_f$ as selected by input IV. The quantity "5" was chosen primarily for convenience of illustration. It has no connection with the fact that a maximum of five in-line targets can be accepted simultaneously. The user of the SAJAC Decider must specify how many Mode 4 responding aircraft he expects to find in the 60-μsec range gate (approximately 5 naut mi), and then the Accept-Decision Counter 81 must be designed to handle that number. It should be noted that, if the number goes beyond seven, an extra stage will be required in the Accept-Decision Counter; also, as the number increases, the size of succeeding registers may be to be increased. The Jam-Analysis gate appearing at input 4 of the Jam Decider provides one input to AND gate 83 so that the next Accept decision appearing in any of the 15 A circuits to which B circuit is connected (see FIG. 3) will start the count. It should be noted that outputs 3 from 15 A circuits are connected to input 4 of B. A count of 1 activates (causes a signal to pass) AND gate 84, a count of 2 activates AND gate 85, etc. AND circuits 117, . . . , 131 are so connected that outputs of the multiplier matrix switch will be 15, 20, or 25 times the value assigned to AND gates 84 through 88 (whichever is enabled). The choice of multiplier 89 depends upon the $T_f$ setting selected for Input IV. These products are connected to the adder 132 along with the value of $T_j$ selected for input V. The Reset Discriminator 133 shown as an alternative input V may be used to set the register consisting of 134 through 140 to any desired number from a remote position.

Figure 8:
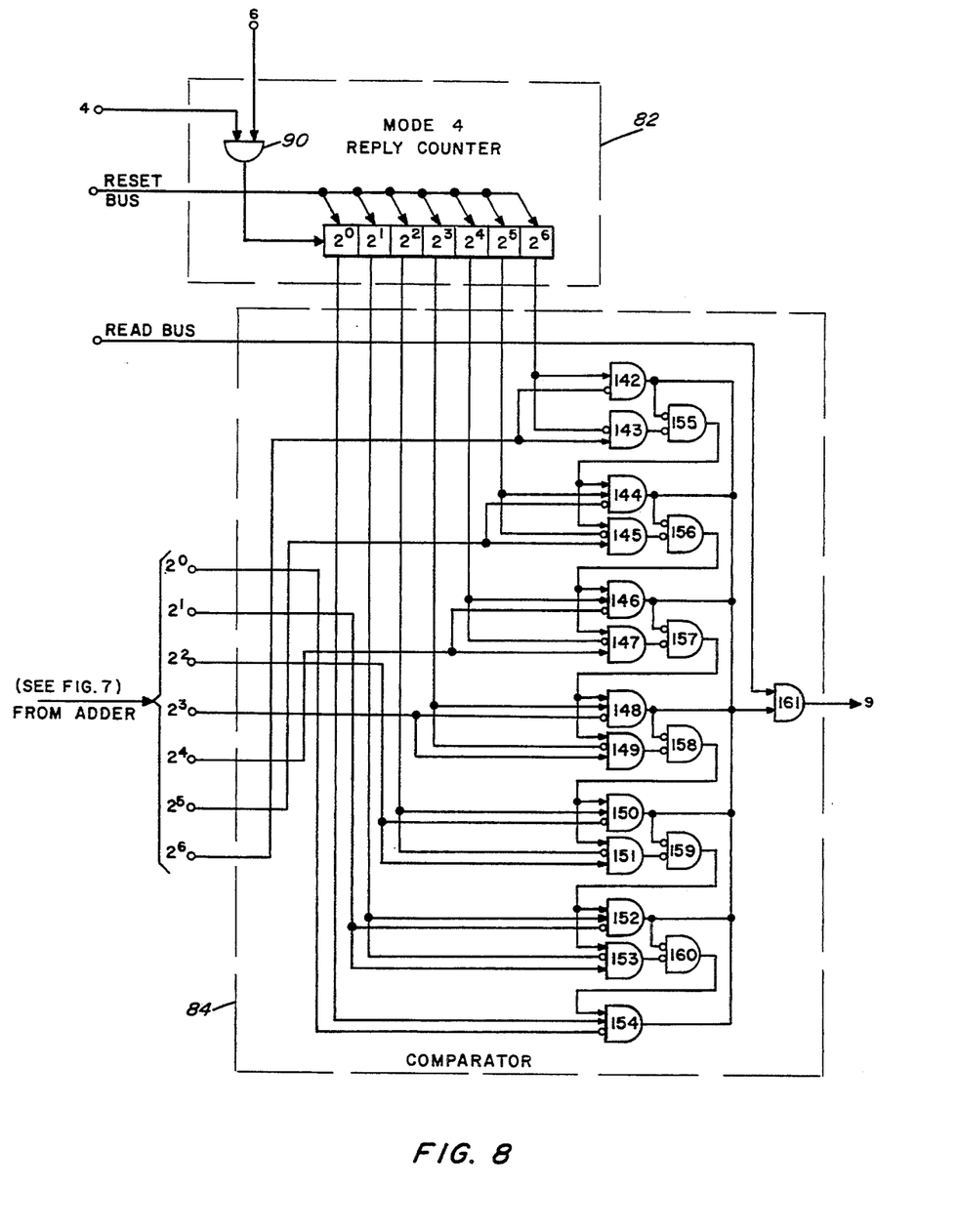
FIG. 8 is a block diagram of the comparator of the Jam Decider logic.

Comparator—The same gate on input 4 that permits AND gate 83 to pass Accept decision also provides one input to AND gate 90 so that the next output on lead 2 from any of the 15 A circuits connected to B circuits (FIG. 3) will start the Mode 4 reply count. It should be noted that outputs 2 from 15 A circuits are connected to input 6 of B (FIG. 3).

The Mode 4 Reply Counter 82 should be capable of counting slightly higher than the number of replies that can be tolerated in any set of 15 4-μsec range gates during a single scan, i.e., in a sample of 16 Mode 4 rounds. Since each friend may provide as many as 20 Mode 4 replies per scan, six friends would almost reach the capacity of the seven-stage Mode-4 Reply Counter 82. However, the Accept-Decision Counter 81 shown in FIG. 7 is capable of handling only five in-line friends, so the SAJAC as described here should not be expected to handle more than that number. It was stated earlier that the Jam Threshold setting $T_j$ could be adjusted to allow an enemy to guess one, two, or three replies to each Mode 4 interrogation without being accepted as a friend. The adjustment that calls for a Jam decision only when an enemy guesses four replies or more per interrogation will be effective when two friends are in the 60-μsec range gate, but the capacity of the Mode 4 reply Counter 82 will be exceeded if more than two are present along with a reply-guessing enemy. The choice of a seven-stage Mode 4 Reply Counter 82 is considered adequate for testing and evaluating the SAJAC Decider. The problem of increasing or decreasing its size as needed would not be too difficult.

AND circuits 142, . . . , 160 compare the number in the Mode 4 Reply Counter register with that coming from the Adder as follows.

First, the leads with a weighting of $2^6$ are compared. If the $2^6$ lead from the Mode 4 Reply Counter 82 carries a 1 while the $2^6$ lead from the Adder 132 carries a 0, then a signal will pass through AND gate 142 (the small circle at the input to AND circuits indicates inversion) to provide one input to AND gate 161. This will cause a Jam-decision pulse to be produced as soon as a pulse appears on the Read Bus. Nothing will pass AND gate 143 or AND gate 145. If the $2^6$ lead from the Adder 132 carries a 1 while the corresponding lead from the Mode 4 Reply Counter 82 carries a 0, a signal will pass through AND gate 143 but nothing will pass AND gate 142; there will therefore be no input to AND gate 161. Also, the signal that passed through AND gate 143, after inversion, will prevent AND gate 155 from having an output. Thus, if the $2^6$ lead from the Mode 4 Reply Counter 82 carries a 1 while the corresponding lead from the Adder 132 carries a 0, a Jam decision will be made. Conversely, if the $2^6$ lead from the Adder 132 carries a 1 while the corresponding lead from the Mode 4 Reply counter 82 carries a 0, no Jam decision will be made. If both $2^6$ leads carry the same number, either a 1 or a 0, a signal will pass AND gate 155 to provide one input to AND gate 144 and one to AND gate 145. These inputs cause AND gate 144 and AND gate 145 to compare the $2^5$ weighted leads in exactly the same manner that the $2^6$ leads were compared. The process will continue until either a pair of leads is found where one carries a 1 and the other a 0, or AND gate 154 is reached. If AND gate 154 is reached and no output comes from its, this means that the two numbers are exactly the same. This result does not call for a Jam decision.

The complementing flip-flop 91 shown in FIGS. 6 and 7, plus the differentiating circuit [d] 92, serves to provide a pulse coincident with the end of the Jam-Analysis gate appearing on input 4 to the Jam Decider. This pulse goes directly to AND gate 161 (and will cause a Jam-decision pulse to appear on output 9 if and only if the number appearing in the Mode 4 Reply Counter 82 register is larger than that coming from the Adder 132. The output of the complementing flip-flop 91 and the differentiator [d] also serves, after a slight delay in delay 93 (long enough to permit the Comparator output to be read), to reset both the Accept-Decision counter 81 and the Mode 4 Reply Counter 82, so that they are prepared to start a new Jam-Analysis sequence.

The Jam decision pulses should be used to produce a strobe on the PPI scope at the azimuth where they occur. This strobe indicates to the radar IFF operator that jamming is definitely present at that azimuth, and, consequently, he cannot believe any Accept decisions that may be displayed at that azimuth. In a more sophisticated automatic Decider, an override circuit may be provided so that when jamming is present, no Accept decisions can be displayed. The Jam decision calls for immediate action, either to eliminate the jammer or to seek cover from probable attack, and to alert other stations with which communications is possible that enemy signals are present.

The circuits described here provide all the logic operations considered necessary for a fully operational system. The described Decider should be capable of demonstrating the feasibility of using a simple device to make accept decisions concerning IFF Mark XII Mode 4 replying targets more accurately and more efficiently than a human operator even make them in the presence of all the extraneous signals that may come from other friendly aircraft. If an enemy tries to spoof or jam Mode 4 by transmitting on the reply frequency, the Decider will indicate this fact and will show precisely what area is being affected by the enemy transmissions. The Decider should permit a major reduction in the rate in which Mode 4 interrogations are transmitted.

Obviously, many modifications and variations of the present invention are possible in light of the above teaching. It is therefore to be understood that within the scope of the appended claims the invention may be practiced otherwise than as specifically described.

What is claimed and desired to be secured by letters Patent of the United States is:

1. A decider circuit for use with an IFF crypto-secure Mode 4 interrogation system for determining the identity of a target, comprising:
    a first plurality of circuit means for indicating the tentative identity of a target as a friend or foe by determining whether a predetermined number of correct responses are received for a known number of Mode 4 interrogations interpreted from the delay in propagation of said responses from said target;
    a second plurality of circuit means coupled to said indicating means for determining whether said tentative friend is a foe attempting to appear as a friend or jamming said reply frequency by sensing the occurrence of more than a predetermined number of incorrect replies.

2. A decider circuit as recited in claim 1, including a shift register coupled to said indicating means for providing gate start and gate stop pulses to said indicating means.

3. A decider as recited in claim 2 wherein said indicating means comprises:
    a gate;
    a first counter coupled to said gate;
    a limiter coupled to said counter;
    wherein said gate indicates whether any responses are received between said shift register gate start and gate stop pulses;
    wherein said counter generates an output signal upon receiving an indication of four successive responses from said gate, said output signal initiating said limiter to count gate stop pulses;
    said limiter disabling said counter upon reaching the count of sixteen;
    said first counter indicating a tentative friend upon receiving seven successive responses from gate before being disabled by said limiter.

4. A decider as recited in claim 3 wherein said determining means comprises:
    a second counter coupled to said first counter;
    a third counter coupled to said first counter;
    a multiplier and adder;
    a comparator;
    said first counter indication signal initiating said second and third counters to count the number of first counter indicating signals from a plurality of indicating means;
    said comparator comparing the count in said third counter with the product of the number of first counter indicating signals and a first threshold number plus a second threshold number;
    whereby a jamming signal is transferred to a displaying means upon the determination of said count in said third counter being greater than said product and sum.

5. A decider as recited in claim 4, wherein said first threshold number equals the number of replies expected by a friend and wherein a friend signal is transferred to a displaying means upon the determination of said count in said third counter being smaller than said product and sum.

* * * * *